(12) United States Patent
Numrich et al.

(10) Patent No.: US 6,765,046 B1
(45) Date of Patent: Jul. 20, 2004

(54) PROCESS FOR PRODUCING POLYMETHYLMETHACRYLATE MOLDING MATERIALS WITH A NEUTRAL COLOR

(75) Inventors: Uwe Numrich, Weiterstadt (DE); Michael Wicker, See-heim-Jugenheim (DE); Klaus Albrecht, Mainz (DE); Heinz Vetter, Rossdorf (DE); Hermann Jaksch, Ober-Ramstadt (DE); Ernst Mohr, Lorsch (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 09/341,669

(22) PCT Filed: Jan. 7, 1998

(86) PCT No.: PCT/EP98/00045

§ 371 (c)(1),
(2), (4) Date: Sep. 3, 1999

(87) PCT Pub. No.: WO98/31736

PCT Pub. Date: Jul. 23, 1998

(30) Foreign Application Priority Data

Jan. 17, 1997 (DE) .......................... 197 01 441

(51) Int. Cl.$^7$ ............................. C08K 3/32; C08L 33/12
(52) U.S. Cl. ..................... 524/414; 524/416; 524/417; 524/560; 525/340
(58) Field of Search ................. 524/414, 416, 524/417, 560; 525/340, 932

(56) References Cited

U.S. PATENT DOCUMENTS

| | | | | |
|---|---|---|---|---|
| 5,063,259 A | * | 11/1991 | Wanat et al. | ................ 523/201 |
| 5,142,008 A | * | 8/1992 | Hölle et al. | ................. 526/193 |
| 5,726,245 A | * | 3/1998 | Numrich et al. | .............. 525/85 |

FOREIGN PATENT DOCUMENTS

| | | |
|---|---|---|
| EP | 0 465 049 | 1/1992 |
| EP | 0 469 372 | 2/1992 |
| EP | 0 776 931 | 6/1997 |

* cited by examiner

Primary Examiner—Kelechi C. Egwim
(74) Attorney, Agent, or Firm—Oblon, Spivak, McClelland, Maier & Neustadt, P.C.

(57) ABSTRACT

Products based on polymethylmethacrylate (PMMA) so resistant to yellowing and so highly transparent that even the edges of plates produced from this material have a neutral colour, i.e. do not display any yellow tone. This effect is obtained by the admixture of 5 to 50 ppm inorganic, reducing phosphorus compounds after polymerisation. This enables the brightener content to be reduced under 10 ppb, and so the end product may also be used in contact with foodstuffs.

18 Claims, No Drawings

PROCESS FOR PRODUCING POLYMETHYLMETHACRYLATE MOLDING MATERIALS WITH A NEUTRAL COLOR

FIELD OF THE INVENTION

This invention relates to the field of molding compositions, especially of products based on polymethyl methacrylate (PMMA) that are so stable to yellowing and highly transparent that even the edge view of panel materials prepared from them is color-neutral and shows no yellow cast.

STATE OF THE ART

Moldings from polymethyl methacrylate (PMMA) are distinguished by good weather resistance and outstanding transparency. PMMA panel material that is produced from molding compositions by extrusion or by injection molding appears practically color-neutral in face view. Of course this does not apply to the edge view. Since a panel viewed from the side has very great visual thickness, an otherwise imperceptible yellow cast becomes clearly visible here. Bluing agents that are added to the molding composition prior to processing are used in the trade to eliminate the yellowish edge impression. This produces a bluish edge impression that is indeed associated with high transparency by an observer in purely visual evaluation, but measurement of the degree of transmission, for example by the method of DIN 5033 (D65/10) shows that the degree of transmission declines with increasing concentration of bluing agent used. This solution is also not ideal since many observers also see a dirty gray or even a red violet tinge of color because of the subjectivity in purely visual evaluation through a very great thickness (edge view). The amount of bluing agent needed to compensate for the yellow cast is also so great that certain fields of application have to be excluded because of government regulations. Thus, for example, the standards enacted for use in food contact (Regulations of the Food and Drug Administration, FDA, for the USA or the corresponding EU directives for the region of the European Union) allow the use of only a few colorants in everyday commodities made of PMMA. Furthermore, the concentration of the bluing agents is limited to very low amounts, often less then 10 ppb (="level of toxicological insignificance").

However, such small quantities of bluing agents are insufficient to compensate completely for the yellowish edge cast. Accordingly, so far there are no panels or moldings made of PMMA molding compositions known in the state of the art whose edge cast could be called color-neutral without containing bluing agents in amounts above the thresholds set by the government.

A great number of general methods have been proposed for preventing or reducing a yellow cast in thermoplastics. For example, the use of antioxidants that are to prevent discoloration of plastic molding compositions under thermal stress, among other effects, are known (for example, see Kirk-Othmer, Encyclopedia of Chemical Technology, 3rd Ed., Vol. 3, page 133, Wiley, New York, 1978). Antioxidants in some cases are also added to the molding compositions prior to processing, in the compounding step. Thus, according to Japanese Application Kokai Tokkyo Koho JP 60 123 547, a reduction of discoloration of copolymers of methyl methacrylate, styrene, and maleic anhydride monomer units is observed at high temperatures under injection molding conditions when at least one phosphaphenanthrene derivative and additionally a sterically hindered phenol, an ester of thiopropionic acid, or an ester of phosphoric acid are added to such copolymers prior to processing as stabilizers against oxidative degradation.

Jpn. Kokai Tokkyo Koho JP 60 120 735 describes copolymers of methyl methacrylate, vinylaromatics, and copolymerized cyclic anhydrides, to which are added esters of phosphoric acid and other stabilizers based on sterically hindered phenols to increase thermal stability and to prevent the discoloration of such copolymers under thermal stress in the melt, for example in injection molding.

Jpn. Kokkai Tokkyo Koho JP 03 167 245 claims the stabilization of copolymers of methyl methacrylate, N-substituted maleimides, and other copolymerizable monomers with compounds chosen from the group consisting of alkyl-substituted triaryl phosphites, dialkyl pentaerythritoldiphosphites, and phosphaphenanthrene derivatives.

Jpn. Kokkai Tokkyo Koho JP 63 163 306 includes copolymers of methyl methacrylate and $C_8$- to $C_{20}$-alkyl methacrylate as core material for optical fibers that contain stabilizers consisting of phosphites, for example such as sterically hindered diaryl pentaerythritoldiphosphites, or thiophosphites, to prevent the discoloration of copolymers under thermal stress.

Sterically hindered phenols and organic phosphites are claimed in all of the Japanese patents mentioned here, or organic phosphites combined with sterically hindered phenols. Inorganic reducing phosphorus compounds are not mentioned.

German Utility Patent 2 95 04 693.7 also describes the use of sterically hindered organic phosphite compounds in molding compositions of copolymers consisting of the monomer units of alkyl methacrylate, vinylaromatic, and maleic anhyd ride, as well as alkyl acrylate optionally. The organic phosphorus compounds are sometimes also added to the finished, granulated, or ground polymer prior to further processing.

Inorganic phosphorus compounds with reducing action are also known from the state of the art as stabilizers against yellowing of molding compositions under thermal stress.

In EP-A 576 877 a polymer based on polymethacrylimide and polyacrylimide with low yellowing is described, with salts of phosphinic acid or phosphonic acid already having been added during the imidization reaction. The amounts used of the phosphorus compounds are high, presumably to compensate for loss of activity in the subsequent processing steps. It is preferred to use amounts of 0.1–1 wt. % based on the amount of polymer to be imidized.

EP-A 0 516 131 A1 describes weather-resistant plastic compositions that contain a UV absorber and a hypophosphite. UV absorbers can be included in amounts of 0.01 to 10 wt. %, and hypophosphite in an amount of 0.001 to 100 wt. % based on the UV absorber contained, i.e. in an extremely wide range of 0.1 ppm to 10 wt. %. The weather-resistance additives are suitable for a number of plastics, including also polymethyl methacrylate.

Agents are also known for reducing discoloration, especially yellowing, for impact strength-modified PMMA molding compositions. These molding compositions contain particularly large numbers of polymerization auxiliaries from their production such as emulsifiers and buffer salts especially, for example when a latex dispersion with a core-shell structure is embedded as toughening phase in a hard PMMA matrix.

EP-A 465 049 (U.S. Pat. No. 5,063,259) describes a method for producing clear, impact strength-modified acrylic plastics with improved color quality, particularly lower yellowing, by adding reducing compounds, for example such as sodium hypophosphite, to emulsion polymers, preferably with a core/shell structure, based on methyl methacrylates. The amounts used can be 50–250 ppm according to claims, based on the emulsion. The emulsion polymers are then incorporated in a polymethyl methacrylate matrix. It is also described how to add the Na hypophosphite first in the polymer matrix (100 ppm) and then to mix it 1:1 with the modifier, so that a final concentration of 50 ppm is obtained.

On the other hand, German Patent Application 1 95 44563.5 describes adding a much smaller amount of inorganic phosphorus compound with reducing action in a later phase of processing, namely in the compounding step, whereby yellowing under thermal stress, for example during the production of moldings, is largely suppressed.

German Patent Application 1 95 44562.7 teaches similarly with regard to the mode of addition of the inorganic reducing phosphorus compounds. They are added to a molding composition based on poly(meth)acrylimide in the compounding step in an amount of 0.01 to 1 wt. %, and they improve especially the color stability under thermal stress.

Apparently by their reducing action, they prevent the formation of chromophores from the amide and imide structural units caused by oxidation.

The European Patent Application with the Application Number 96 111 330.5 describes dust-repellent PMMA molding compositions supplied with ethoxylated fatty amines, to which are likewise added reducing inorganic phosphorus compounds to suppress the yellowing effect of the fatty amines. In this case also, the reducing inorganic phosphorus compounds are added only during the compounding.

The impurities contained in the molding compositions that are responsible for yellowing can be named explicitly in the aforementioned patent applications. This is not true of molding compositions based on PMMA that need hardly any auxiliaries for their production and whose monomers contain no chromophores.

Problem and Solution

The underlying purpose of this invention was to find a method that permits the production of moldings from molding compositions based on polymethyl methacrylate (PMMA) that are color-neutral in thick layers. This applies above all to the edge view of panel material. At the same time, the high optical quality of the PMMA was not to be noticeably impaired, i.e., the transmission according to DIN 5033/5036 (degree of light transmission for daylight (D65)) of the PMMA should still be in the range of 89–92% through a thickness of 100 mm.

It should also be possible to produce such color-neutral moldings economically in one step by a simple process. Since the amounts of reducing inorganic phosphorus compounds used as the agents of choice were to be very small, namely below 30 ppm based on the finished moldings, preferably even below 20 ppm, a method had to be found to be able to incorporate such small amounts of reagent homogeneously in the molding compositions. Finally, the method should make it possible to produce the moldings FK produced from the molding compositions FM pursuant to the invention with added amounts of bluing agents below 10 ppb, to permit also the use of the moldings, for example, in contact with foods.

The problem was solved by a method for producing molding compositions FM, from which moldings FK are produced that have no yellow cast even in thick layers and that have a transmission of 89–92% through a thickness of 100 mm, consisting of a polymer PM made up of 80–100 weight-percent methyl methacrylate and 0–20 weight-percent $C_1$-to $C_4$-alkyl ester of acrylic acid characterized by the fact that added to the polymer PM in the completely polymerized state is 0.0005 to 0.005 weight-percent of one or more reducing inorganic phosphorus compounds that are selected from the group consisting of phosphinic acid and phosphonic acid and their alkali metal, alkaline earth, aluminum, and ammonium salts, wherein the ammonium salt may be substituted with up to four $C_1$- to $C_4$-alkyl and/or $C_5$- to $C_8$-cycloalkyl groups.

The Polymer PM

The polymer PM consists of 80–100 weight-percent methyl methacrylate and 0–20 weight-percent $C_1$- to $C_4$-alkyl esters of acrylic acid. The polymer PM is also called PMMA Standard Molding Composition. The polymerization process itself does not concern the present invention; the state of the art in this regard is assumed.

The molecular weight $M_w$ (weight-average) of the polymer PM can be in the range of 50,000 to 300,000, preferably from 80,000 to 250,000, with particular preference 100,000 to 200,000, and especially 130,000 to 190,000. The molecular weight $M_w$ can be determined, for example, by gel permeation chromatography or by light scattering (for example, see H. F. Mark et al., Encyclopedia of Polymer Science and Engineering, 2nd Ed., Vol. 10, pages 1 ff, J. Wiley, 1989).

After polymerization, the volatile constituents are drawn off from the polymer, especially residual monomers, by degassing, for example. This can be done in several steps under decreasing pressure, or under vacuum. Suitable systems for depressurizing vaporization are generally known. The last fractions of volatile constituents are usually degassed in a degassing extruder at temperatures of 220 to 280° C. under a pressure of 10 to 150 mbar ($1\times10^3$ to $1.5\times10^4$ Pa). After passing through the degassing zone, the degassed molding composition melt is brought to high pressure in a compression zone of the extruder and is extruded as a strand or a bundle of strands. The strands are cooled to below their softening point in the usual way and are chopped into a commercial molding composition granulate. The cooling can be done before, during, or after the chopping.

The incorporation of the reducing inorganic phosphorus compounds AP pursuant to the invention can occur either by mixing with the finished granulate or by mixing into the melt stream in the degassing extruder, preferably after the last degassing zone. In any case, it is metered into the polymer PM after it is completely polymerized.

The Reducing Inorganic Phosphorus Compounds AP

The reducing phosphorus compounds AP contain phosphorus in oxidation states +1 or +3. Salts of phosphinic acid (hypophosphites) and of phosphonic acid (secondary phosphites) are readily available industrially, as well as the free acids themselves. It is of no consequence whether the salts or the free acids are in the ortho form or the meta form, or as dimers, for example. Alkali metal, alkaline earth, aluminum, and ammonium salts can be used, and the ammonium ion can be substituted with up to four $C_1$- to $C_4$-alkyl and/or $C_5$- to $C_8$-cycloalkyl groups. Organic phosphorus compounds with reducing action selected from the group of aliphatic or monoarylaliphatic esters are far less effective. This is true especially of the various antioxidants of the state of the art based on organic phosphites.

Sodium hypophosphite is particularly effective and also economically available. Its use is a preferred form of embodiment of the invention. Although according to the literature it is decomposed readily by heat with disproportionation, it has proved useful for the purposes of the invention. The mode of addition according to the invention apparently prevents premature thermal decomposition of this reducing agent.

Alkaline earth hypophosphites such as calcium hypophosphite, for example, are thermally more stable. However, it has turned out that especially larger amounts of calcium hypophosphite can lead to cloudiness in the molding composition and/or in the moldings produced from it. Mixtures of various reducing inorganic phosphorus compounds can also be used.

Unexpectedly compared to the state of the art, with regard to the use of reducing inorganic phosphorus compounds, even the lowest concentrations of them are sufficient pursuant to the invention. Thus, detectable effects are produced even with 0.0005 wt. % (=5 ppm) based on the polymer PM. The maximum effect can be achieved even with 0.001 to 0.004 wt. % (10–40 ppm), preferably 0.0015 to 0.003 wt. % (15–30 ppm). If the reducing inorganic phosphorus compound is used in its hydrate forms, the water of crystallization has to be subtracted when calculating the amount used.

Amounts used that are higher than 50 ppm based on the polymer PM as a rule provide no further improvement of optical properties, and in fact in special cases they even cause deterioration of properties, for example incipient irreversible cloudiness in the polymer, which is detectable from lower transmission values.

The inorganic reducing phosphorus compounds AP pursuant to the invention as a rule are applied in solution. Water is a suitable solvent. The reducing phosphorus compounds are advantageously used in concentrated solution. A concentration of 50 wt. % can be given as a guideline. The concentrated solution is ordinarily used at room temperature. Depending on the temperature of solution and application, other concentrations are possible or necessary, for example 5 to 65 wt. %. In case particularly small amounts of inorganic reducing phosphorus compounds are added, the concentration in water that is selected can also be lower, for example 10–30 wt. %. It is surprising that such a small volume of reducing agent as is represented by a concentrated solution of the phosphorus compound can apparently be distributed homogeneously through the entire charge of polymer.

However, it is also possible to apply the reducing inorganic phosphorus compound in powdered form, without using solvents.

Although it is conceivable in principle to add the individual components of a mixture of reducing phosphorus compounds to the polymer in succession, a mixture or solution of the components is usually prepared first and added to the polymer in one step. A one-part stabilizer is more beneficial for homogeneous distribution. Addition of blue pigments or blue dyes for the optical neutralization of any yellow cast can be accomplished at the same time with the inorganic reducing phosphorus compounds. As a rule, 5 to 50 ppb of bluing agent is added. A content of less than 10 ppb is preferred. Bluing agents are commercially available. Examples that may be mentioned are Ceresblau GN or a mixture of Ultramarine Blue 31 and Ultramarine Violet 11 in a 1 to 4 ratio.

Addition of inorganic reducing phosphorus compounds AP in aqueous form can be disadvantageous inasmuch as the water is sooner or later brought to the melt temperature during processing and can thereby lead to small gas bubbles in the polymer. It has been found surprisingly that aliphatic $C_{12}$- to $C_{20}$-carboxylic acids, especially palmitic acid, are very suitable as solvents for the inorganic reducing phosphorus compounds AP and the formation of gas bubbles can be avoided. Relatively dilute solutions of AP in palmitic acid are prepared, for example 0.1 to 20 weight-percent solutions. It is preferred to use 1 to 15 weight-percent solutions, and 2 to 10 weight-percent solutions are especially preferred. The bluing agent can also be fed in dissolved in palmitic acid. The amount of palmitic acid based on the polymer PM is 0.01 to 0.5, preferably 0.03 to 0.3 wt. %. The addition of the inorganic reducing phosphorus compounds AP pursuant to the invention in palmitic acid solution is a preferred embodiment of the invention.

Incorporation of the Reducing Inorganic Phosphorus Compound AP

The reducing inorganic phosphorus compound AP is incorporated pursuant to the invention at a late time during processing. In this way premature decomposition of the decolorizing agent seems to be avoidable. Above all, it is not exposed to long-lasting high thermal stresses. The addition is generally made after completion of the polymerization reaction. At this time the polymer PM contains less than 1 wt. % residual monomer, preferably less than 0.5 wt. % residual monomer.

There is the possibility of adding the reducing inorganic phosphorus compound AP into the PMMA melt stream by introducing it continuously in the degassing extruder. The point of infeed is preferably chosen so that the addition occurs into the melt already degassed. The advantage of adding into the melt stream in the degassing extruder is that no additional processing step is necessary, and it can follow seamlessly after the polymerization. After cooling and chopping, a molding composition FM is obtained in particulate form that contains the inorganic reducing phosphorus compounds AP in homogeneous distribution and in an effective concentration. When producing moldings FK from this material, especially panel material, the effect pursuant to the invention occurs; the edge view is neutral.

Another possibility is to add the reducing inorganic phosphorus compound AP to the finished polymer PM, i.e. to the "standard molding composition", in the compounding step. To carry out this process step in accordance with the invention, the polymer PM should be in particulate form. For example, granulates or ground product in very diverse particle sizes are especially suitable. It is preferred to choose an average particle size of 1–5 mm.

The reducing inorganic phosphorus compound AP is ordinarily mixed with the polymer PM in particulate form in the compounding step first with slow-running mixing units, for example such as drum, cage, or double-chamber plow-blade mixers. The slow-running units produce mixing without eliminating the phase boundaries (cf. Ullmanns Encyclopedia of Industrial Chemistry, 4th Edition, Vol. 2, pages 282 to 311, Verlag Chemie, Weinheim, New York, 1980). This mixture is processed thermoplastically in the following process step of melting. Extruders are again used for this, or to speak generally, heated mixing units, at the temperatures suitable for it, usually between 220 and 280° C. Examples are single-screw or multiple-screw extruders or extruders with oscillating screws, and optionally with shear pins in addition. The molding compositions FM pursuant to the invention can be prepared by this method in granulate particle sizes, for example of 1 to 5 mm.

The molding process can then again follow. Popular methods of the art such as injection molding, extruding, pressing, sintering, or other forming processes are suitable for this. There are no limitations on the configuration of the molding FK.

Another variation of addition consists of adding the inorganic reducing phosphorus compounds AP in the form of a so-called masterbatch during the molding process. In this case, a small portion of the molding composition that is already in granulated or ground form is melted in a separate extruder, and the reducing inorganic phosphorus compounds AP are added to the melt. They can be fed in here, for example, as a solution, or they can already have been previously mixed with the granulated molding composition. The melt containing the inorganic reducing phosphorus compounds AP in relatively concentrated form is combined with the major portion of the molding composition in the extruder and thereby diluted to the effective concentration pursuant to the invention. After the subsequent molding to shape of the resulting granulate, the molding FK pursuant to the invention is also obtained here.

Other modes of addition are conceivable, with the addition having to be made in each case to the essentially completely polymerized polymer PM in order to be able to produce the benefits of the invention.

Beneficial Effects of the Invention

The method of incorporating the reducing inorganic phosphorus compound is usually a single, simple processing step because the stabilizing agent is added as one component. It is advantageous that there needs to be no intervention in the customary production process since the polymer PM is the "standard molding composition", is a current product and is manufactured on a large industrial scale. The method is very economical with respect to the amount and chemical nature of the reducing inorganic phosphorus compound AP: only little stabilizer is used, and it is particularly inexpensive in the case of sodium hypophosphite. The benefits in use are important. Thus, the molding FK pursuant to the invention is practically colorless even in great thicknesses after carrying out the process pursuant to the invention. Test specimens have to be made in the form of prisms or cuboids that allow measurement through a thickness of 100 mm to measure yellowness. Ordinarily, test specimens with dimensions of 45×45×100 mm are used. Their yellowness or $Y_i$ yellow index—which is measured according to DIN 6167 (D65/10°) or according to ASTM D 1925 —when prepared according to the invention with the addition of inorganic reducing phosphorus compounds is at least 40% lower for a thickness of 100 mm than for those prepared not according to the invention, i.e. without the use of inorganic reducing phosphorus compounds. As a rule the yellowness values are even 50% lower. Instead of yellowness, the transmission of a block 100 mm thick can also be used to characterize the optical properties. The transmission of a block prepared according to the invention is close to the theoretical value of 92%, namely 89 to 92%. These measurements also show that the addition of inorganic reducing phosphorus compounds AP at the concentration pursuant to the invention causes hardly any impairment of transmission even at such a great thickness. When palmitic acid is used instead of water as solvent for the inorganic reducing phosphorus compounds, any formation of steam bubbles in the extrudate is avoided, and an especially homogeneous distribution of the reducing agent is obtained.

Finally, the method pursuant to the invention permits the content of bluing agent in the molding composition to be reduced to below 10 ppb, whereby the edge view of the finished molding FK is neither yellowish, nor dirty gray, but color-neutral.

EXAMPLES

Examples 1–4

5 kg of a "standard molding composition" made up of 96 wt. % methyl methacrylate and 4 wt. % methyl acrylate (Plexiglas® Molding Compound 7N from Rohm GmbH, Darmstadt, $M_w$ (weight-average) approx. 110,000) is mixed with a 12.5 wt. % aqueous solution of sodium hypophosphite in a tumble mixer. The proportion of this solution is varied so that the end product contains the following amounts of inorganic reducing phosphorus compound:

Example 1: no addition (=a comparison example)

Example 2: 0.6 g solution =15 ppm sodium hypophosphite

Example 3: 1.2 g solution =30 ppm sodium hypophosphite

Example 4: 2.4 g solution =60 ppm sodium hypophosphite

The bluing agent is also added at this point at a concentration of just below 10 ppb, namely from 4 to 9.5 ppb. The mixture of the granulate with the additives is then melted at 240° C., extruded, cooled, and chopped, with the molding composition FM pursuant to the invention being produced in particulate form. To obtain test specimens with the necessary great thickness, molten extrudate is collected in aluminum pans, cooled, and cut into blocks 45×45×100 mm in size. Only bubble-free blocks were selected. The faces are machined flatparallel with a polishing mill until the surface is glossy.

The transmission of these blocks is measured through the 1 00-mm longitudinal axis with a spectrophotometer in the visible wavelength region between 380 and 780 nm according to DIN 5033 (D65) and the yellowness $Y_i$ is determined according to DIN 6167 (D65/10°).

Examples 5–8

The method of Examples 1–4 is followed, with the difference that the molding composition Plexiglas® 7 H is used instead of the molding composition Plexiglas® 7 N. Plexiglas® 7 H molding composition has the same composition as Plexiglas® 7 N but has a higher molecular weight $M_w$ (weight-average) of about 170,000.

The polymers are compounded similarly to Examples 1–4 with increasing amounts of sodium hypophosphite in 12.5 weight-percent aqueous solution:

Example 5: no addition (=a comparison example)

Example 6: 0.6 g =15 ppm sodium hypophosphite

Example 7: 1.2 g 30 ppm sodium hypophosphite

Example 8: 2.4 g =60 ppm sodium hypophosphite

Examples 9 and 10

The method of Examples 5–6 above is followed, with the difference that sodium hypophosphite is added in palmitic acid solution. The small amount of bluing agent (9.5 ppb) is also dissolved in palmitic acid.

Example 9: addition of 0.05 wt. % palmitic acid with no sodium hypophosphite (=a comparison example)

Example 10: Addition of 0.05 wt. % palmitic acid with 0.0015 wt. % =15 ppm sodium phite dissolved in it (one milliliter of palmitic acid contains 36.14 mg of sodium phite monohydrate, which is 30 mg sodium hypophosphite, and the solution is sodium hypophosphite).

Results

| Example No. | Polymer | Sodium hypo-phosphite | Solvent | Transmission % D65 | | Yellowness D65 | |
|---|---|---|---|---|---|---|---|
| | | | | 1st Measurement | 2nd Measurement | 1st Measurement | 2nd Measurement |
| 1 (Comparison) | Plexiglas FM 7N | 0 ppm | — | 90.5 | 90.5 | 2.2 | 2.4 |
| 2 | Plexiglas FM 7N | 15 ppm | Water | 90.8 | 90.9 | 1.2 | 1.1 |
| 3 | Plexiglas FM 7N | 30 ppm | Water | 90.6 | 90.7 | 1.1 | 1.2 |
| 4 | Plexiglas FM 7N | 60 ppm | Water | 91.0 | 90.9 | 1.1 | 0.9 |
| 5 (Comparison) | Plexiglas FM 7H | 0 ppm | — | 89.8 | 89.6 | 4.9 | 4.8 |
| 6 | Plexiglas FM 7H | 15 ppm | Water | 90.0 | 90.3 | 2.7 | 2.5 |
| 7 | Plexiglas FM 7H | 30 ppm | Water | 89.3 | 90.1 | 2.3 | 2.2 |
| 8 | Plexiglas FM 7H | 60 ppm | Water | 87.5 | 88.2 | 2.3 | 2.4 |
| 9 (Comparison) | Plexiglas FM 7H | 0 ppm | Palmitic acid | 90.1 | 90.0 | 4.4 | 4.4 |
| 10 | Plexiglas FM 7H | 15 ppm | Palmitic acid | 89.7 | 90.7 | 2.5 | 2.5 |

The reduction of yellowness can be seen clearly even with the addition of only 15 ppm sodium hypophosphite. Increasing the dosage produces no substantial further improvement of yellowness. The edge view was color-neutral in all of the test specimens prepared according to the invention. All 10 examples were prepared with less than 10 ppb of bluing agent, and are therefore practical for use in the food sector.

What is claimed is:

1. A method for producing a molding composition consisting of a polymer comprised of 80–100 weight-percent of methyl methacrylate monomer units and 0–20 weight-percent of C1-to C4-alkyl ester of acrylic acid monomer units and a reducing inorganic phosphorus compound, wherein the method comprises:

adding to said polymer 0.0005 to 0.005 weight-percent, based on the weight of said polymer, of one or more reducing inorganic phosphorus compounds selected from the group consisting of phosphinic acid, phosphonic acid, alkali metal salts of phosphinic acid, alkali metal salts of phosphonic acid, alkaline earth salts of phosphinic acid, alkaline earth salts of phosphonic acid, aluminum salts of phosphinic acid, aluminum salts of phosphonic acid, ammonium salts of phosphinic acid, and ammonium salts of phosphonic acid, wherein the ammonium salts may be substituted with up to four C1-to C4-alkyl and/or C5-to C8-cycloalkyl groups, and wherein a molding of 100 mm thickness prepared from said molding composition has a transmission of 89–92%, and wherein the yellow index according to DIN 6167 (D65/10E) or according to ASTM D 1925 of a molding of 100 mm thickness prepared from said molding composition is at least 40% lower than a molding of 100 mm thickness prepared from said molding composition without said one or more reducing inorganic phosphorus compounds.

2. The method of claim 1, wherein said reducing inorganic phosphorus compounds are added in an amount of 0.001 to 0.003 wt. %, based on the weight of said molding composition.

3. The method of claim 1, wherein said reducing inorganic phosphorus compound is sodium hypophosphite.

4. The method of claim 1, wherein the inorganic reducing phosphorus compounds are admixed in a compounding step with the polymer present in particulate form.

5. The method of claim 1, wherein said reducing inorganic phosphorus compounds are added to said polymer after it is degassed.

6. The method of claim 5, wherein said reducing inorganic phosphorus compounds are added to said polymer in a degassing extruder after a degassing zone.

7. The method of claim 1, wherein the inorganic reducing phosphorus compounds are added in the form of a masterbatch to the polymer in particulate form.

8. The method of claim 1, wherein said reducing inorganic phosphorus compounds are added in the form of an aqueous solution.

9. The method of claim 8, wherein the aqueous solution contains 5 to 65 wt. % of the reducing inorganic phosphorous compounds.

10. The method of claim 1, wherein the reducing inorganic phosphorus compounds are added dissolved in palmitic acid.

11. The method of claim 1, wherein one or more bluing agents are also added to the polymer.

12. The method of claim 11, wherein the molding composition contains less than 10 ppb of the bluing agents, based on the molding composition.

13. A method of producing a molding, comprising:

preparing a molding composition according to claim and forming a molding from the molding composition, wherein the yellowness of the molding according to DIN 6167 (D 65, 10°) measured through a thickness of 100 mm is at least 40% lower than the yellowness of a molding with the same molding composition prepared without addition of inorganic reducing phosphorus compounds.

14. The molding produced by the method of claim 13.

15. A method for producing a molding composition consisting of a polymer and one or more reducing inorganic phosphorus compounds, comprising:

adding to said polymer, wherein said polymer is comprised of 80–100 weight-percent of methyl methacrylate monomer units and 0–20 weight-percent of C1-to C4-alkyl ester of acrylic acid monomer units, 0.0005 to 0.005 weight-percent, based on the weight of said polymer, said one or more reducing inorganic phosphorus compounds selected from the group consisting of phosphinic acid, phosphonic acid, alkali metal salts of phosphinic acid, alkali metal salts of phosphonic acid, alkaline earth salts of phosphinic acid, alkaline earth salts of phosphonic acid, aluminum salts of phosphinic acid, aluminum salts of phosphonic acid, ammonium salts of phosphinic acid, and ammonium salts of phosphonic acid, wherein the ammonium salts may be substituted with up to four C1-to C4-alkyl and/or C5-to C8-cycloalkyl groups.

16. A molding composition consisting essentially of:
(a) a polymer comprised of 80–100 weight-percent of methyl methacrylate monomer units and 0–20 weight-percent of C1-to C4-alkyl ester of acrylic acid monomer units, and
(b) 0.0005 to 0.005 weight-percent, based on the weight of said polymer, of one or more reducing inorganic phosphorus compounds selected from the group consisting of phosphinic acid, phosphonic acid, alkali metal salts of phosphinic acid, alkali metal salts of phosphonic acid, alkaline earth salts of phosphinic acid, alkaline earth salts of phosphonic acid, aluminum salts of phosphinic acid, aluminum salts of phosphonic acid, ammonium salts of phosphinic acid, and ammonium salts of phosphonic acid, wherein the ammonium salts may be substituted with up to four C1-to C4-alkyl and/or C5-to C8-cycloalkyl groups.

17. A method of making a molding, comprising forming the molding composition of claim 15 into a mold.

18. The mold produced by the process of claim 17.

* * * * *